(12) United States Patent  (10) Patent No.: US 8,122,069 B2
Soules et al.  (45) Date of Patent: Feb. 21, 2012

(54) METHODS FOR PAIRING TEXT SNIPPETS TO FILE ACTIVITY

(75) Inventors: Craig A. Soules, San Francisco, CA (US); Karl Anders Gyllstrom, Chapel Hill, NC (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 587 days.

(21) Appl. No.: 12/255,619

(22) Filed: Oct. 21, 2008

(65) Prior Publication Data

US 2010/0115001 A1    May 6, 2010

Related U.S. Application Data

(60) Provisional application No. 61/079,165, filed on Jul. 9, 2008.

(51) Int. Cl.
    *G06F 7/00* (2006.01)
(52) U.S. Cl. ......... 707/821; 707/822; 707/771; 715/254
(58) Field of Classification Search ................ 704/9, 10; 715/204, 254, 256; 707/821–822, 771
    See application file for complete search history.

(56) References Cited

U.S. PATENT DOCUMENTS

| | | | | |
|---|---|---|---|---|
| 7,610,279 | B2* | 10/2009 | Budzik et al. | 1/1 |
| 7,617,199 | B2* | 11/2009 | Budzik et al. | 1/1 |
| 7,844,581 | B2* | 11/2010 | Dubnicki et al. | 707/693 |
| 2008/0005067 | A1* | 1/2008 | Dumais et al. | 707/3 |
| 2010/0115003 | A1* | 5/2010 | Soules et al. | 707/822 |

\* cited by examiner

Primary Examiner — Belix M Ortiz

(57) ABSTRACT

A method collects user interface events and file system events to capture text snippets in focus on an output device. The method then pairs the text snippets with related files to build a context graph and discover files associated with a task.

15 Claims, 5 Drawing Sheets plato, philosopher, socrates, album, thumbnail, item, subalbum, upload, file, hegel, bc, philosophy, athens, photo, platon, kant, use, time, caption, wikipedia, size, add, sort, ancient, default, greece, edit, apply, description, oracle, summary, administrate, megabyte, set, philosophic, argue, date, option, create, western, charge, gallery

METHODS FOR PAIRING TEXT SNIPPETS TO FILE ACTIVITY

CROSS REFERENCE TO RELATED APPLICATIONS

This Application claims the benefit of U.S. Provisional Application Ser. No. 61/079,165, filed Jul. 7, 2008, titled "Methods For Paining Text Snippets To File Activity" which is hereby incorporated by reference herein as if reproduced in full below.

BACKGROUND

The amount of information stored on personal computer systems is enormous and rapidly expanding. Some file systems use hierarchical organization to store computer files. Files are named and placed in a directory. The number of files, however, can easily exceed thousands or tens of thousands. Searching and locating specific files can be quite challenging.

Content-based search tools are used to locate files on a computer system. A user enters a keyword or words, and the tool searches given files for the occurrence of the keyword. The tool then displays the search results to the user.

Content-based searches provide a simple search tool, but are not effective for many types of searches. For example a user might forget an important keyword or search for a file that does not contain the keyword entered in the search query. In other instances, some files, such as images, are not searchable with keywords since these files do not contain text.

In view of the large amount of files and data stored on computer systems, users need effective tools for organizing and searching such files.

DETAILED DESCRIPTION

Figures 1, 6:
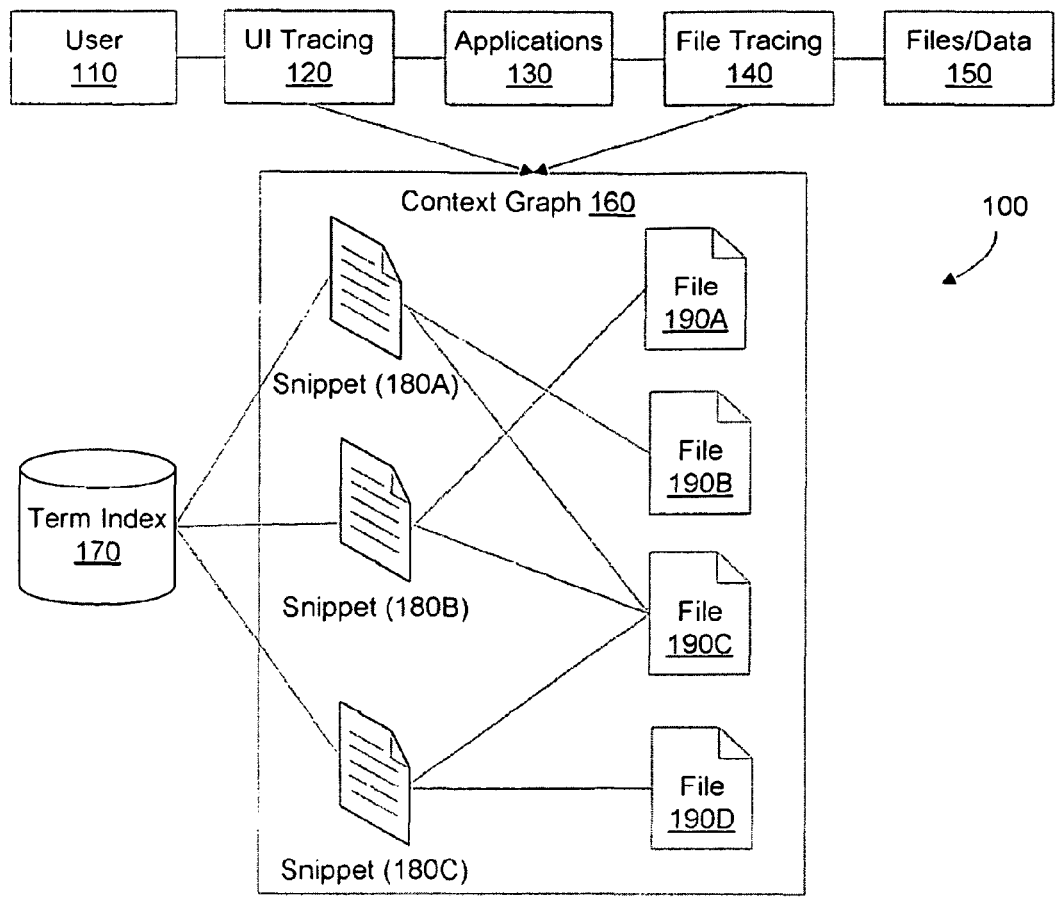
FIG. 1 illustrates a high-level block diagram of a computer system according to an exemplary embodiment.
FIG. 6 illustrates a zeitgeist produced for an image chosen by a user during a photo album task on the topic of "philosophers" according to an exemplary embodiment.

Exemplary embodiments are directed to systems, methods, and apparatus for pairing screen text to file activity. In one embodiment, context information gathered from visible text on a screen of a user is used to recall files the user interacted with during a time period. Exemplary embodiments identify which files are related to visible text from a trace of user activity.

One exemplary embodiment captures a trace of file events and witnessed text snippets (i.e., screen text events). Any snippet that was seen within some context interval of time of the file event is considered related with some strength. As discussed in more detail herein, the strength of this relationship is defined as D*P, where D is defined as the duration of the snippet and P is defined as the proximity of the snippet to the file event. Exemplary embodiments then create a context graph that is used both to retrieve documents (for example, from a user query) and classify documents.

One exemplary embodiment is a personal document retrieval and classification system that abstracts applications by considering only the text the applications present to tile user through a user interface (UI). Associating the visible text which surrounds a document in time, one exemplary embodiment identifies information about the task within which a document is used. This context enables novel, useful ways for users to retrieve their personal documents.

One exemplary embodiment addresses a disconnection between user-perceived context and file contents. Instead of indexing file contents, text displayed at the user-interface level is captured and indexed. Using temporal locality, a mapping is created between text snippets and files used while the snippets were displayed. This extends a two-level mapping approach of terms to documents to a three-level mapping of terms to snippets to documents. This three-level index is used to both classify documents, finding relevant terms from related text snippets, as well as retrieve documents, searching the index of text snippets and then following them to relevant documents.

Conceptually, the three-level index performs task-based classification and retrieval by matching the contents of displayed text during a given task to tile set of files used for that task. For example, a user who forgets the name of a file attached to a past email might remember the contents of the email. Upon receiving a query from the user, exemplary embodiments match the contents of the email and return the attached file.

One exemplary embodiment implemented the three-level index for retrieval and classification in user studies in two applications: document retrieval and context tagging respectively. A user study with document retrieval shows that one embodiment recalls 70% more data on task-based retrieval without a loss of precision, and recalls 15% more data on known-item retrieval with only a slight drop in precision. The user study with context tagging shows that classification is considered accurate by users, even when documents contain no indexable data (e.g., images).

Despite continued abstraction of the user's document space, user interactions with documents have changed comparatively little. For example, users populate a spreadsheet in the same manner whether using a local spreadsheet application or a remote, different spreadsheet application. As another example, writing an email does not functionally change, regardless if the user works with web mail or a local email application. This signifies a trend of divergence between the user's activity in the user interface layer and its complementary activity in the file system layer.

This divergence makes the user interface layer an attractive space to capture activity context because it (a) is very tightly coupled with user interaction, (b) involves activity which is less sensitive to change (e.g. typing), and (c) exposes the contents of the objects with which a user interacts, even when those objects have no "indexable" form (e.g. they are not local, they are application specific files, etc).

Exemplary embodiments have identified five aspects of divergence between the user interface layer and the file layer: location, composition, presentation, interaction, and temporality.

Location determines where file data is stored. With the advent of the internet, more and more work has moved from local files to remote files. Now, the functionality of many traditionally local applications has been replicated on web pages. This trend presents difficulty to systems that try to support task management using strictly local data. For example, one approach to this problem is to leverage web caching to capture remote data locally. For example, desktop indexing tools index the user's web cache and return these pages as results to searches. The failing of this approach is its reliance on particular application behavior to perform correctly. Already the introduction of un-cached AJAX applications renders such schemes inadequate, requiring further specificity. Furthermore, user activity is not limited to reading items; they also create content. While this content can manifest to a file (e.g. one saves their work), more and more this content is posted to the web (e.g. tagging photos on a web site) making it difficult or impossible to capture through the web cache. Rather than attempting to capture this data, one exemplary embodiment captures information at the user-interface which renders the location of the underlying data irrelevant.

In cases where file activity occurs on local files, systems still face the problem of file composition, or the fact that file management is often application-specific and difficult to generalize. While email clients vary little in terms of the mail reading functionality exposed to users, they vary widely in how an individual email manifests on the file system. For example, some mail clients store each message as an independent file, while others store emails to a single database. This convention precludes approaches which require fine grained file access information, like when a specific email was last opened. Furthermore, similarly to location, most classification and retrieval systems address composition through application assistance. Most indexing tools have plug-ins for common file formats (PDF, PST, etc.) that given them some access to data stored in proprietary formats. This can still be insufficient to identify accesses to sub-file information. Instead, one exemplary embodiment ties text seen through the user interface to file system events and removes the need to support each application separately.

Presentation refers to the divergence between file contents and the application's presentation of those contents. A PDF (Portable Document Format) document can contain a large number of pages, but PDF readers typically do not reveal more than two pages to the user at a time. Consider a case where a user is only interested in a single page of the PDF: indexing the PDF's contents captures non-relevant information. Similarly, client side scripting allows HTML (Hypertext Markup Language) page elements to change visibility: collapsing large drop-down regions and open others interactively. Due to the stateful nature of modern, interactive web pages, it is often difficult to infer the user's interest from the contents of the HTML page alone. Presentation is thus a problem in existing classification and retrieval systems. However, by limiting itself to contents displayed by the application, one embodiment only captures text that the user actually views.

Interaction refers to the disconnection between application activity and user activity. A user can have numerous applications open with all but one are minimized. Because the user is only interacting with the visible application, it is likely that background activity performed by other active applications are acting without direction from the user. One exemplary embodiment captures focus information to identify active applications. Instead of trying to use this to filter content information, the embodiment captures the visible contents directly from the user interface layer.

Temporality refers to the problem of knowing when, and for how long, a user interacted with data. Capturing "recently accessed" information can be complex (such as collecting information about recently accessed files or web pages). For example, web browsers maintain caches of recently viewed sites, but they provide no information about how long a user viewed that site. Consequently, a link the user accidently clicked through and returned from would not equally important to a page the user spent an hour reading. Inferring this information from time between their access time is not trustworthy, consider the case where one page is opened quickly after another, though in a different browser window. Should the user switch back to the previous window and spend a long time viewing the page, analysis of the browser history would indicate the wrong page was viewed for longer. As such, one exemplary embodiment captures all file system activity and determines when and how long a user examined a particular file. It then uses this information to identify web-like relationships among local files.

Exemplary embodiments combine user interface and file layer information to accurately build information context from what a user actually sees. Location and composition are dealt with by capturing the contents of remote files or files with proprietary formats at the user interface layer. Presentation issues are resolved by the fact that the user-interface layer displays only what the application intends the user to see (e.g. the currently read page of a large document). Interaction issues are, by definition, best handled at the user interface layer, where information about what is and is not visible is managed. Temporality issues are resolved by algorithms of exemplary embodiments that combine the timing of user interface events with the timing of file events to create a mapping from text snippets to files weighted by the level of user interaction.

FIG. 1 illustrates a high-level block diagram of a computer system 100 for implementing one exemplary embodiment in accordance with the present invention. The system shows a user 110, UI tracing 120, one or more applications 130, one or more files or data 150, context graph 160, and a term index 170. The context graph 160 further includes different snippets 180A-180C (referred to generally as 180) and different files 190A-190D (referred to generally as 190).

Figure 2:
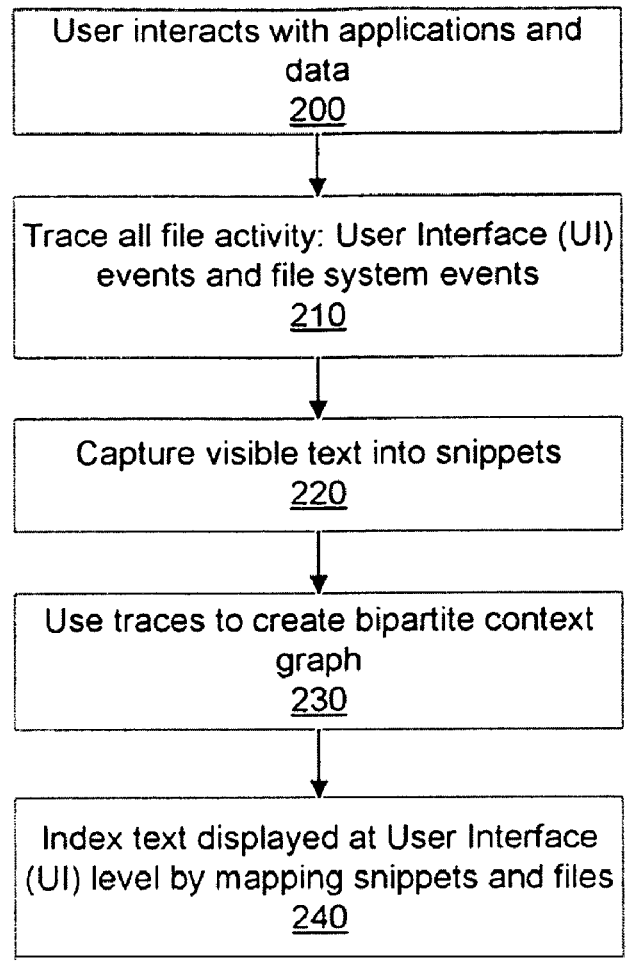
FIG. 2 illustrates a flow diagram for indexing text displayed at a User Interface (UI) level according to an exemplary embodiment.

FIG. 2 illustrates a flow diagram for indexing text displayed at a User Interface (UI) level according to an exemplary embodiment. FIGS. 1 and 2 are discussed simultaneously.

As the user 110 interacts with applications 130 and data 150 (shown in block 200), the system collects data about their context, captures visible text into snippets 180, and traces all file activity. Specifically, the system traces all file activity that includes tracing User Interface (UI) events and file system events (shown in block 210). The system also captures visible text being displayed to the user as snippets (shown in block 220). Using these traces, the system creates a bipartite context graph 160 that maps between snippets 180 and files 190 (shown in block 230). Then, the system indexes text displayed at the UI level by mapping snippets 180 to files 190 to build the term index 170 (shown in block 240).

Exemplary embodiments discuss the utility of the context graph 160 with two examples: a document retrieval tool that combines a search index on the snippet contents with the context graph, and a context tagging tool that identifies relevant terms for files based oil their snippets. These examples are discussed below under the headings "Data Collection" and "Context Graph" below. Some example applications are then discussed under the heading "Application: Document Retrieval" and "Application: Context Tagging" below.

Data Collection

Exemplary embodiments provide a context-aware system that understands behavior of users, independent of which applications and file formats they use. One embodiment traces both user interface and file system events at the operating system layer. These traces capture and store four pieces of information: (1) text snippets of what the user sees, (2) the times at which these snippets become visible to the user, (3) the duration over which these snippets are visible, and (4) the times at which files are accessed.

One exemplary embodiment acquires text snippets through an accessibility functionality. By way of example, uses an accessibility functions similar to previous uses that enable third party applications that interact with the user interface programmatically to support impaired users. Accessibility data is exposed by many mainstream operating system (OS) graphical interfaces. Accessibility support enables custom programs to query arbitrary applications for information about their UI state, such as which tab or pane is currently focused, and the contents of a text area. While accessibility information can be designed by an application's developers, the use of system components in UI construction means that much of this information is already provided.

One exemplary embodiment traces activation and minimization of application windows, informs the system when windows go in and out of visibility or focus, and tracks tile duration over which the windows remain visible or focused. Whenever a window changes visibility, one exemplary embodiment captures all visible text on the screen into a snippet and inserts this snippet into the stream of trace events. Exemplary embodiments can also execute periodic captures of such snippets (for example, perform periodic captures once every three seconds to handle cases where focus does not change, but the visible text does change).

Exemplary embodiments also trace file read and write operations to identify which files are accessed when. This trace of file system events is later merged with the trace of user interface events when creating the context graph.

Context Graph

Figure 3:
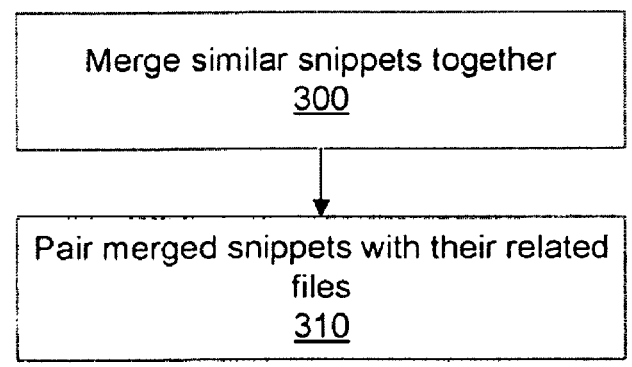
FIG. 3 illustrates a flow diagram for creating a bipartite context graph according to an exemplary embodiment.

FIG. 3 illustrates a flow diagram for creating a bipartite context graph according to an exemplary embodiment. The relationship between snippets and files is represented by a bipartite context graph, with links between nodes indicating the strength of the contextual relationship between them. The context graph is created in two steps. The first step is to merge similar snippets together (shown in block 300), and the second step is to pair merged snippets with their related files (shown in block 310).

Figure 4:
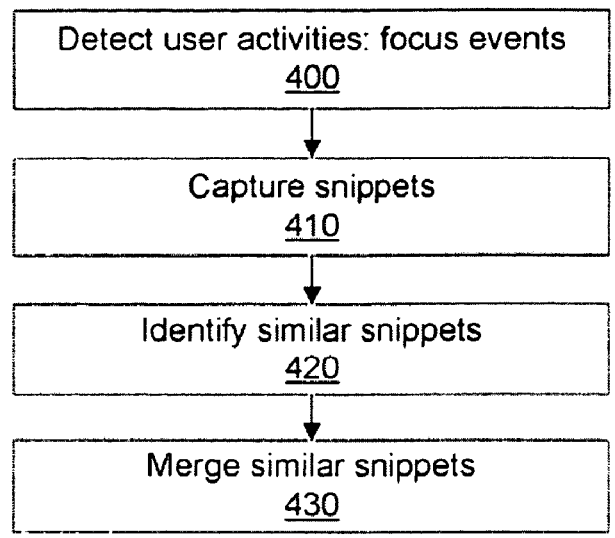
FIG. 4 illustrates a flow diagram for merging similar snippets together according to an exemplary embodiment.

FIG. 4 illustrates a flow diagram for merging snippets according to an exemplary embodiment.

User activity often involves switching among multiple applications or windows. As such, one exemplary embodiment treats every focus event as a new source of text (shown in block 400 as capturing user activities). This activity can generate many snippets of identical text that originate from the same conceptual document (e.g. the same web page). As shown in block 410, these snippets are captured or stored. Most classification and retrieval techniques rely on a discriminating value of terms in the corpus (often inverse document frequency). If a term appears frequently within a snippet while relatively infrequently in the rest of the corpus, it is considered informative. Consequently, populating the corpus with many duplicate snippets reduces effectiveness at classifying and retrieving documents. Hence, one exemplary embodiment implements a document similarity technique to identify similar snippets (shown in block 430) and then merge similar and identical snippets to substantially reduce this effect (shown in block 440).

By merging similar snippets, and not just identical snippets, exemplary embodiments accommodate for slight changes in visible text (e.g., status bar updates, open menus) yet still identify completely separate snippets (e.g., next page in a PDF, new web page). For example, one embodiment identifies similar snippets using a Max Hash algorithm. Max Hash uses landmark chunking (implemented with Rabin fingerprinting) to break snippets into variable sized chunks. Landmark chunking has the advantage that, because the chunk boundaries are chosen based on content, small changes to the file will only change a small number of the chunks. Each chunk is then hashed using, for example, MD5, and the hashes are sorted numerically. If the top n hashes of chunks of two snippets match, then it is very likely that the snippets are similar. By way of example, any two snippets that share more than half of their hashes are treated as identical. Since snippet size is governed by the amount of text that can appear on a screen, the number of hashes for a snippet is small, and sharing half of these hashes indicates with highly probability that the two snippets are very similar.

One exemplary embodiment uses Max Hash as a similarity metric because it is (a) robust to small changes in content and (b) efficient in performance and space. To find if a snippet has an existing similar snippet, two hash tables are maintained. The first table contains hash values as keys and snippets containing that hash within their top n hashes as values. The second table is the reverse: snippets are keys and their top n hashes are values. When a new snippet is witnessed, it is chunked and hashed. For each of tile top n hashes, one embodiment queries the hash table for any snippets that contain the hash. It then finds the top n hashes for each matching snippet. If at least h of the new snippet's top n hash values match an existing set of hash values, the two snippets are considered similar. This process requires only n lookups to find a similar file and the list of hashes for each file is n 32-bit values. Thus both the computational and storage requirements are small.

Figure 5:
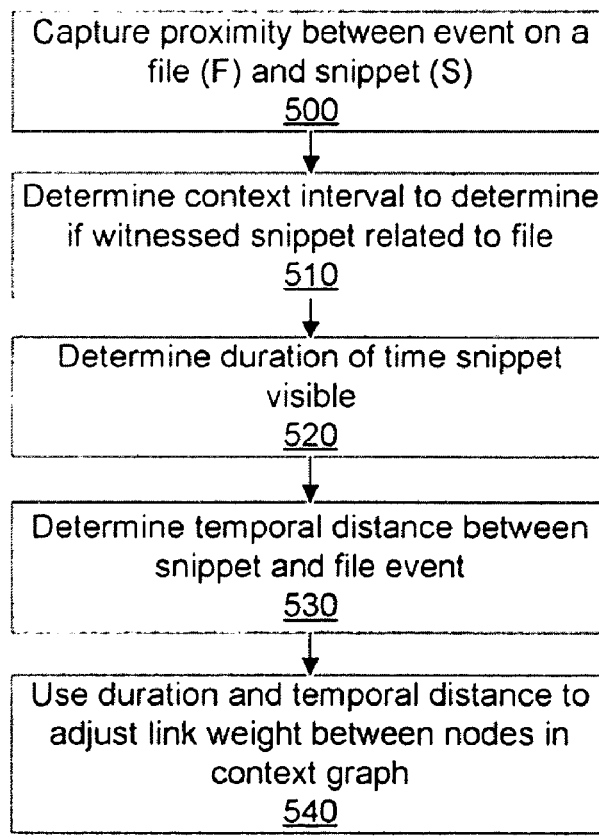
FIG. 5 illustrates a flow diagram for pairing merged snippets with their related files according to an exemplary embodiment.

FIG. 5 illustrates a flow diagram for pairing merged snippets with their related files according to an exemplary embodiment.

According to block 500, the proximity between an event on a file (F) and a snippet (S) is captured. The link weight between a snippet and a file node is increased when snippet S is seen in close temporal proximity to an event on file F. One exemplary embodiment captures this proximity through a context interval (i.e., a time period during which witnessed snippets are considered to be related to that file) as shown in block 510. A context interval of n seconds means that any snippet S witnessed less than n/2 seconds before or after an event for file F is related to F. Thus, snippets and files that are more frequently proximal will, generally, have higher relative link weights between them.

One exemplary embodiment strengthens links using two factors: duration and temporal proximity. According to block 520, a duration of time is determined during which the snippet is visible. In other words, duration measures the length of time over which a snippet was visible. Intuitively, this captures the relative importance of the data contained within the snippet. For example, let $S_{start}$ be the point at which snippet S is seen that is not similar to the previous snippet in the trace is seen and $S_{end}$ be the point at which a new snippet that is not similar to S is seen. The definitions of $S_{start}$ and $S_{end}$ merge sequences of similar snippets into a single snippet for the purposes of measuring visibility time. Then, Equation 1 defines the duration value for a snippet S as follows:

$$\text{duration}(S) = (S_{end} - S_{start}) / \text{contextinterval} \quad \text{(Equation 1)}.$$

According to block 530, a temporal distance is determined between the snippet and the file even. Temporal proximity measures the temporal distance between the snippet and a file event. The closer in time a snippet appears to a file event, the more likely it is to be related to the file event. Weighting by temporal proximity relates events over a longer period of time without introducing too much noise (e.g. an infinite context interval equally relates all snippets to all files). For example, let $t_F$ be the time at which file event F occurs. Then, Equation 2 defines the temporal proximity weight between snippet S and file F as follows:

$$\text{proximity}(S, F) = S_{start} < t_F < \text{Send } 1$$
$$\_o.w.\ 1 - \frac{(\min(|t_F - S_{start}|, |t_F - S_{end}|, \text{context interval}/2)}{(\text{context interval}/2)}.$$

When snippet S falls within the context interval of file F, one embodiment increases the value of the link between them by the product of duration and temporal proximity. As shown in block 540, the duration and temporal distance (or temporally proximity) are used to adjust (for example, strengthen) the link weight between the nodes in the context graph.

Application: Document Retrieval

One exemplary embodiment implements document retrieval by combining a content index built over the snippet contents (shown as the term index 170 in FIG. 1) with the context graph. The content index is maintained by adding new snippets (i.e., snippets with no similar existing snippets) as they are seen.

To retrieve a document given a user query, the query is first passed to the content index to identify relevant snippets, and then the context graph is used to identify related documents. Specifically, the content index returns a pool P that contains a list of $[S_i, V_i]$ tuples where $S_i$ is a snippet and $V_i$ is its corresponding relevance score. A search is then performed on the context graph to identify R, the set of files most related to P.

R starts as an empty result pool to be composed of 2-tuples containing a file and its relevance score. For each snippet $[S_i, V_i] \Box P$, each link is retrieved to a local document $[F_j, L_j]$ where $F_j$ is the local file and $L_j$ is the value of the link. $F_j$ is inserted into R (if it does not already exist), and the relevance score is increased by $(L_j \times V_i)$. Thus, cases where a file contains incoming weight from numerous snippets, its relevance score contains the sum of each individually contributed relevance score. Finally, R is sorted by relevance score and returned.

Application: Context Tagging

In context tagging, one embodiment takes a given file, finds related snippets, and uses their contents to create a textual summary—or context zeitgeist—of that file. Unlike content classification, which uses a file's contents to identify relevant terms for that file, context tagging uses the contents of the activity that surrounds a file while it is used to identify relevant terms, offering terms that the file's contents might not even contain.

For example, an image file on a user's computer might have no useful information text content within it. Let us assume that after downloading the image from their camera, the user uploaded the image to an image and video hosting website and entered a title, description, and tags for that image through the website. Because these operations generated a set of content events surrounding the file event for the image (e.g. the time it was uploaded), they will share links with that image on the context graph. The textual contents of these content events will contain useful pieces of information about the image: its title, tags, and description as entered by the user.

Context tagging operates much like an inverted search. Given a file F, let P be the set of snippets related to F in the context graph. Let T be the set of tuples $[t_i, f_i, c_i]$ where $t_i$ is a unique term from the contents of the snippets in P, $f_i$ is the total number of occurrences of term $t_i$, and $c_i$ the count of snippets containing $t_i$ (stop words, or words considered too common to be useful in retrieval, are omitted from T). Let D be tile set of all snippets in the context graph. Let $D_t$ be the set of all snippets containing a term t, identified through the term index. For each $[t_i, f_i, c_i] \Box T$, one embodiment computes a score for each ti using a variant of tf-idf defined in Equation 3 as shown below:

$$tf_i = fi / \left( \sum_{jk \in T} \cdot fk \right) \quad \text{(Equation 3)}$$
$$= (\log|D| - |P| + 1)/(|Dt_i| - c_i + 1).$$

The effect of Equation 3 is to treat the set of snippets P as a single logical snippet. Thus, it calculates term frequency ($tf_i$) across the contents of all snippets in P, and calculates inverse document frequency ($idf_i$) as if all of the snippets in P were removed from the corpus and replaced with a single snippet containing the term.

One exemplary embodiment then calculates the final tf-idf score for each term as the product of the term's tf and idf values, sorts the terms by their scores, and returns the list of terms as the file's context zeitgeist.

The purpose of the ensuing discussion and evaluation is to show the effectiveness of exemplary embodiments with respect to two applications: task-based document retrieval and context tagging. Unlike traditional content-based retrieval and classification, context-based tools require that users interact with the data in realistic usage scenarios in order to gather the necessary traces, ruling out the use of an existing document corpus. Thus, the evaluation employs a two-phase user study in which users first interact with a data set while being traced by an exemplary embodiment and then later are asked to evaluate two applications of the exemplary embodiment with respect to that data.

We chose to run all of the users in this study on a single machine under a single account. Limiting the scope of the content or context information to a single user would trivialize the task of finding related data (since all available data would be relevant). Merging the traces of several users simulates a single user performing a set of similar tasks over a longer period of time, providing a more realistic usage scenario for an exemplary embodiment.

Phase One

Phase one consisted of two user tasks. We chose the user tasks to include a mix of local and remote data, as well as a mix of content-friendly (e.g., text) and content-free (e.g., image) data. Including all kinds of data highlights how an exemplary embodiment identifies useful context information regardless of the source, and even applies it to data that cannot be indexed through traditional means.

Task 1 was the creation of a conference trip report using a wiki, a web-based collaboration tool interfaced through a standard web browser, installed on a separate machine. The user was asked to create a wiki page briefly describing three papers from a fictitious conference. The user was instructed to choose three papers at random from a pre-generated corpus of PDF files, skim each paper, write a brief (1-2 lines) summary of the paper oil the wiki page, and upload the paper to the wiki. Once the user selected a PDF it was removed from the corpus to prevent overlap with other users.

Task 2 was the creation of an online photo album. The user started by creating a photo album using a photo album website installed on a separate machine. The user was given a topic (e.g. marine animals) and asked to identify three items within that topic (e.g. dolphins, manatees, and orcas). For each item, the user was asked to acquire an image of that item online, down-load it to their machine, and then upload it to the photo album. The user was then asked to provide a brief description of that item as researched online (e.g. through Wikipedia) and place that description within the "description" category of the photo on the photo site.

Phase one included 15 users, 10 of which completed both Task 1 and Task 2, 12 of which completed only Task 1, and 13 of which completed only Task 2. Each task took users between 20 and 45 minutes to complete.

Phase Two: Retrieval

We evaluate two aspects of document retrieval: task-based retrieval and known-item retrieval. Task-based retrieval, specific to context systems, returns all of the items related to the task described by the user's query. Known-item retrieval, the more common form of document retrieval, returns a single item desired by the user.

Three to seven days after completing phase one, users were asked to return for the retrieval task. Because most users would be unfamiliar with task-based retrieval, we felt that asking them to perform and evaluate such retrieval tasks might introduce a bias toward an exemplary embodiment. Instead, we asked users to locate each document used in a task by performing known-item retrieval through a popular desktop tool, a traditional content-only desktop search tool. For the trip report task, this included the wiki page containing their report along with each paper they summarized. For the photo album task, this included each photo file, each Wikipedia page, and the page depicting their album. Users were allowed to issue three queries for each document with the goal of generating a query that would return it as the first result.

We then used the most effective queries users formulated for each document, 138 in all, to evaluate task-based retrieval and known-item retrieval of an exemplary embodiment, comparing its results against those identified by popular desktop tool. In these experiments, the exemplary embodiment was parameterized with a 30 minute context interval, allowing any text viewed within 15 minutes of a file to be related. For task-based retrieval we report recall and precision values. For each document's query, we measure the task-based recall as the percentage of local documents from that document's task that were returned. We do not consider results where neither method was capable of producing one task item. We measure the task-based precision as the ratio of correct documents returned to total documents returned at the point where the last correct document is returned. For known-item retrieval we report recall and average position values. We measure average known-item recall as the percent-age of queries that return the desired item. We measure average position based on the document's position within the result list, including only those queries that return the document.

To even the comparison between exemplary embodiment and the desktop tool, we filtered the results of desktop tool in two ways. First, we remove results that were not accessed at least once by a user. Second, when comparing the desktop tool and the exemplary embodiment, we remove any web-cache results. Because exemplary embodiment only indexes local files that have been accessed and the retrieval task only considers local files as correct results, to include other files (e.g., un-accessed files or web-cache results) would unfairly penalize desktop tool. We also exclude results from the exemplary embodiment for files within known system directories (e.g., Local Settings), as the desktop tool considers these files irrelevant, and to include them in the exemplary embodiment would unfairly penalize it.

Table 1 lists the task-based recall and precision values for both the exemplary embodiment and desktop tool. For task-based retrieval the exemplary embodiment achieves nearly 100% recall with the same precision as desktop tool. This indicates that users could retrieve any document used in a task by remembering just one document from that task. Even in the case of remote documents (e.g., the wiki page) this holds true, highlighting ability of the exemplary embodiment to utilize information from any source when retrieving local data. Note that given the task sets were small, 4-7 documents, a precision of 56% indicates that all of the documents would be listed in the first 15 results.

TABLE 1

Task-based retrieval

| Task | Exemplary Embodiment Recall | Exemplary Embodiment Precision | Desktop Tool Recall | Desktop Tool Precision |
|---|---|---|---|---|
| $Task_1$ | 0.945 | 0.500 | 0.314 | 0.557 |
| $Task_2$ | 1.000 | 0.701 | 0.170 | 0.471 |
| $Task_{all}$ | 0.963 | 0.556 | 0.266 | 0.530 |

We believe that the results of the task-based retrieval of the exemplary embodiment should be considered in isolation. Because the desktop tool was not designed with task-based retrieval in mind, a direct comparison against the exemplary embodiment is less meaningful. Furthermore, in the retrieval task users issued queries intended to recall individual items. Had they issued queries to find as many familiar items as possible, their search strategies might have been more general.

Table 2 lists the known-item recall and average position for both the exemplary embodiment and desktop tool. As compared to desktop tool, the exemplary embodiment recalled more items but, on average, positioned those items slightly further into the results. This illustrates two results. First, de-spite the increase in average position, the exemplary embodiment placed results well within the first page of results, indicating that it's known-item retrieval could replace traditional content-only retrieval with little effect on the user.

TABLE 2

Known-item retrieval

| Task | Exemplary Embodiment Recall | Exemplary Embodiment Precision | Desktop Tool Recall | Desktop Tool Precision |
|---|---|---|---|---|
| $Task_1$ | 0.945 | 0.500 | 0.314 | 0.557 |
| $Task_2$ | 1.000 | 0.701 | 0.170 | 0.471 |
| $Task_{all}$ | 0.963 | 0.556 | 0.266 | 0.530 |

Second, the exemplary embodiment found documents when desktop tool did not, especially in the image retrieval task, again showing the relevance of user-interface text when applied to content free data. For example, a search for "James Gleick" through desktop tool was unable to retrieve the image file "log1.jpg" because neither the contents nor the name of the image were relevant, while the same search in the exemplary embodiment was able to retrieve the image. In cases of PDF recall, the slight improvement in recall was largely due to users unknowingly placing too much information in their query for desktop tool to work. For example, a search for "hierarchy projection paper" failed in desktop tool because the term "paper" was not present in the document itself, though present in the context (e.g. the wiki summary was titled "paper review").

The success of the exemplary embodiment in task-based retrieval shows that (a) as an element of task a document contributes some content to that context, (b) a query that identifies a document can also identify the context of which it is a part, and (c) a query that identifies a context should identify all files which where used as part of that context.

While users worked with specific applications in this experiment (e.g. a PDF reader, a browser), it is important to note that the way in which context was collected and applied was application independent. Had the users been instructed to report their summaries in an email rather than a web page, the text they generated would have still been available and useful in retrieval. Given the contents of this email would be acquired by its screen text rather than its file contents, the exemplary embodiment's access to the information would persist regardless of whether users' emails were through Outlook or an email program. Hence, the exemplary embodiment enables context retrieval without making any assumptions about applications beyond the fact that they must eventually present text to the user through the UI.

Phase Two: Classification

To test context tagging in the exemplary embodiment, we need to show that the terms it identifies as relevant are considered accurate by the user of that file. We chose one local file at random from each of the two tasks (i.e., one PDF and one image) for each user and generated a zeitgeist for each file using context tagging, which we term the context zeitgeist. We also placed each of the PDF's into a single content index and asked it for the set of keywords it considered most relevant for each PDF, creating a content zeitgeist for each PDF, which we term the decoy zeitgeist. In these experiments, a context interval of 10 minutes was used. We then presented users with five zeitgeists for each of their two randomly chosen files. To avoid triggering memories with users for the retrieval evaluation, this phase followed the retrieval evaluation, typically by 1-2 days. For the PDF we presented the context zeitgeist, the decoy zeitgeist, and three other randomly chosen context zeitgeists for other files not accessed by that user, which we term incorrect. For the image, we presented the context zeitgeist, and four incorrect zeitgeists. We asked the user to rank each zeitgeist on a 3 point Likert scale where 3 indicates that the terms describe tile file well, and 1 indicates that the terms are irrelevant for the file.

FIG. 6 illustrates an example zeitgeist 600 produced for an image chosen by a user during the photo album task on the topic "philosophers." Bold italicized words describe the topic (plato, philosopher, socrates, hegel, bc, philosophy, athens, kant, ancient, greece, philosophic, argue, and western), bold words describe the task (album, subalbum, upload, photo, Wikipedia, caption, and gallery), and the underlined word (platon) was contained within one of the image's file name.

We draw three points from this example. First, 15 of the first 20 words are relevant to tile file, either describing the topic, task, or filename. Second, both the topic of choice, philosophers, and the source of information, Wikipedia, are represented in the zeitgeist, either of which the user may recall when trying to retrieve an item. Third, many of the irrelevant words are included because there is not enough overall system data to exclude them. For example, words such as thumbnail, item, add, sort, administrate, etc. would reduce in significance as a user interacted with the photo album software more.

Table 3 lists the results of our classification experiment. When considering the incorrect zeitgeists, we took the highest scored incorrect zeitgeist for each user's task and averaged that score across users. For example, if a user for task 1 scored the incorrect zeitgeists 1, 1 and 2 respectively, we considered 2 as the best incorrect score and averaged those scores across users for task 1. For each zeitgeist, we present the average score, standard deviation, and P-value as calculated by the t-test between that zeitgeist and the context zeitgeist. We show the results for each task, and the average across both tasks.

TABLE 3

Classification results

| Task | Target | χ | σ | p-value |
| --- | --- | --- | --- | --- |
| 1 | Context | 2.45 | 0.82 | — |
| 1 | Best Incorrect | 1.55 | 0.82 | 0.017 |
| 1 | Decoy | 2.09 | 0.83 | 0.314 |
| 2 | Context | 2.89 | 0.33 | — |
| 2 | Best Incorrect | 1.11 | 0.33 | 0.000 |
| 1 + 2 | Context | 2.65 | 0.67 | — |
| 1 + 2 | Best Incorrect | 1.35 | 0.67 | 0.000 |

We draw three conclusions from these results. First, the context results are significantly better than the best incorrect result in all cases, indicating that context tagging is successful. Second, the context results in Task 1 perform as well the decoy results. This indicates that the snippets of the exemplary embodiment are able to capture the relevant text of an indexable document at least as accurately as document content alone. Third, the context results for Task 2 are extremely accurate, achieving an average score of nearly 3. This indicates that the exemplary embodiment accurately classifies documents that contain no indexable terms at all, an impossible task with traditional content-based schemes.

Exemplary embodiments can also be applied in cases where users have documents whose origin or use they do not recall. For example, when discovering an unfamiliar document in a long-before used folder, enabling the user to see important words from the surrounding activity might reveal important insight (e.g. the paper was downloaded in a previous literature review).

Users are generally more able to recall the context in which a file is used than the file itself. One of the primary reasons for this is that this context often contains information about the personal ways in which a user conceptualizes a document. For example, in the process of doing a literature search for a research paper on contextual retrieval, one might issue the query "papers on contextual retrieval", to which a search engine might be able to return papers on a conceptually similar topic like "personalized search". This retrieval is enabled in part by the fact that the hyperlinked structure of the web can leverage the multiple ways in which the universe of users organizes information. For example, an individual might link to a "personalized search" paper within their "context retrieval" web page, enabling search tools to connect the similar concepts. In local document retrieval, this structure cannot be leveraged. However, being able connect the user's initial query to the document which was ultimately retrieved through a system of an exemplary embodiment allows the user to implicitly describe their own documents through their behavior.

Exemplary embodiments utilize user interface (UI) events to develop file context information. One embodiment uses UI information to discover groups of related files stored in a computer. UI events are recorded and stored, along with file access information such as read, write, open, etc. By way of example, UI events include, but are not limited to, keyboard inputs, window focus changes on an application in a display, clicks from a mouse or pointer, window visibility events, widget focus changes, and mouse or pointer movement. Logs are then processed in various ways in order to group files based on the notion of user tasks. For example, files used in a related or same logical task are grouped together. By contrast, non-related files are separated.

Once the files are grouped, the groupings are used in a variety of ways. For instance, the groups assist in desktop searching. By way of example, if a keyword search for files locally stored on a personal computer discovers document A, context information previously associated with document A is used to find that files B and C (example, a jpeg image and spreadsheet file) were used as part of the same task. Files A, B, and C are discovered as being related and relevant to the input query even though these files were created with different applications (example, file A created with a word processor application, file B created with a photo editing application, and file C created with a spreadsheet application). Further, even if files B and C did not match the keyword search that produced file A, files B and C would still be discovered since they are related and relevant to the search.

Exemplary embodiments, however, include a variety of uses. By way of example, embodiments are used with various tasks that have common or related files grouped together, such as information life cycle management tasks (example, archive all of the documents associated with a task in similar or same storage locations), provenance tasks (example, given a file A, determine other files used with, related to, or derived from file A), discovery tasks (example, locate all documents accessed or opened during a specified time period), and enhancing desktop or personal computer system searches.

One embodiment uses a temporal context for desktop searches wherein files that are accessed in the same time period are likely to share a task commonality—even when those files share little or no content similarities. One embodiment comprises two main parts: context building and searching. Contextual relationships are captured by a context graph, where nodes represent files and snippets, and the links between them reflect the strength of their contextual relationship. To build the context graph, a file system monitor records file operations, such as open, write, and read, as a user interacts with a computer system. One embodiment uses window focus events or active window events that are generated whenever a user changes the active window (example, through a mouse click, alt-tab hot key, or minimization of the active window).

Exemplary embodiments track various UI events. By way of example, such events include, but are not limited to, clicks (example with a mouse or pointer), keyboard inputs, window focus changes, determinations of which windows are visible versus obscure on a display, determinations of which windows are minimized to an icon, determinations of which windows are enlarged from an icon, etc.

Figure 7:
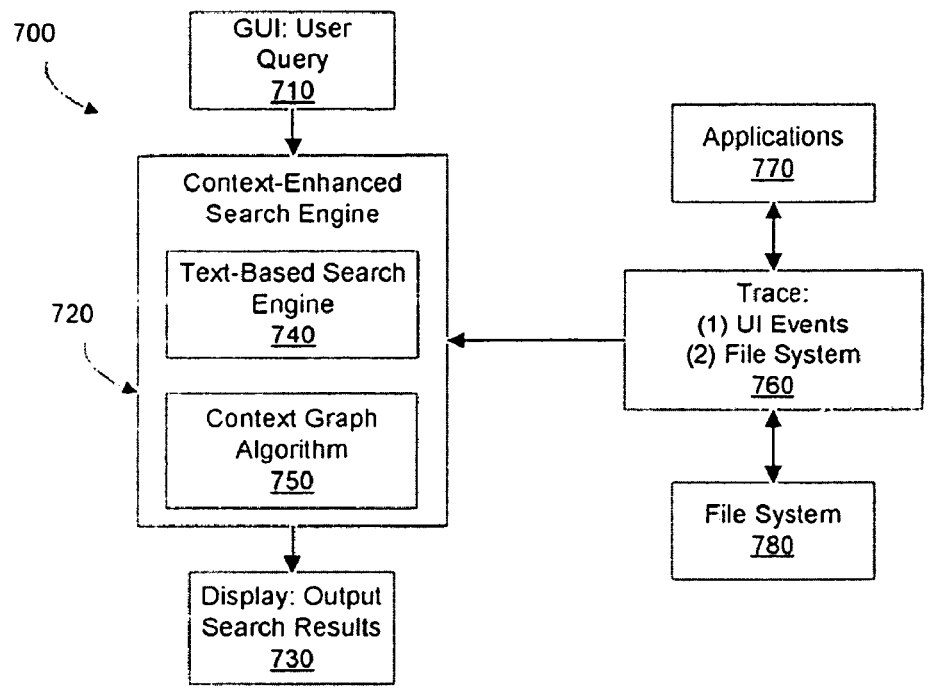
FIG. 7 illustrates a high-level block diagram of a computer system for responding to search queries according to an exemplary embodiment.

FIG. 7 illustrates a high-level block diagram of a computer system 700 for responding to search queries according to an exemplary embodiment. A user enters a search or query (example, one or more keywords) through an interface 710, such as a graphical user interface. A context-enhanced search engine 720 receives the search and generates a ranked list of results at a display 730.

The context-enhanced search engine generally includes a text-based search engine 740 and a context graph algorithm 750. When the search is received, the text based search engine 740 performs a content search for files having the keywords. Discovered files from this search are fed into the context graph algorithm 750 which supplements the search results with contextual relationships. The combined search results from both the text-based search engine 740 and context graph algorithm 750 are provided to the user.

In order to generate the contextual relationships, a trace 760 is located between applications 770 and file system 780. The trace 760 monitors UI events and the file system to identify contextual relationships between files running on one or more different applications. By way of example, files are mapped to nodes in a graph. Edges extend from one node to another and represent contextual relationships between files. The weight of an edge indicates the strength of a relation between two nodes or two files.

Information from trace 760 is output to the context-enhanced search engine 720. Here, the context graph algorithm 750 identifies contextual relations in the information and generates appropriate relation graphs.

By way of example, in one embodiment, the trace software includes two parts: a kernel layer hook and a UI layer hook. The kernel layer hook records read, write, rename, and delete file operations, along with data about the event, including file name, time, and process identifier. Additionally, process creation and deletion events are recorded, which enable generation of a relationship tree of processes. The process enables identification of parent/child relationships between process identifiers.

The UI layer hook monitors window focus (example, when a window gains focus via a mouse click, alt-tab, etc), widgets acquiring keyboard focus, window move/resize, and scroll events. Additionally, embodiments can record data about these events, such as time, process identifier, and window/widget identifiers. The event recording software maintains a log of events that are stored remotely or locally on a computer of the user.

Figure 8:
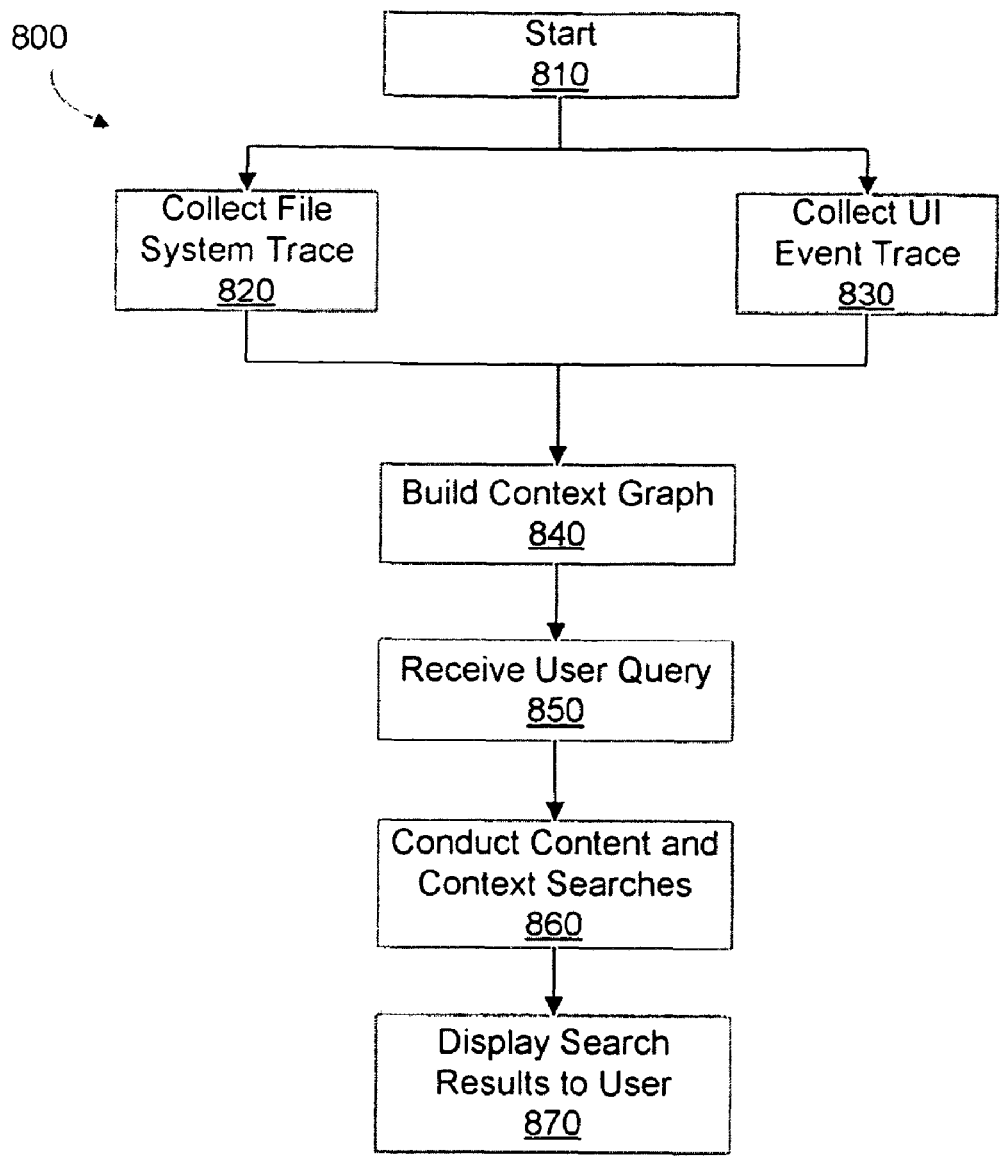
FIG. 8 is a flow diagram for building a context graph and responding to search queries according to an exemplary embodiment.

FIG. 8 is a flow diagram 800 for building a context graph and responding to search queries. The diagram starts at block 810 and simultaneously collects file system trace information at block 820 and UI event trace information at block 830. Information obtained from the traces is used to build the context graphs according to block 840. According to block 850, a user enters a query, such as a keyword search into a personal computer. The search is conducted using both a content search engine and a context search (example, a context graph) as shown in block 860. In one embodiment, the content search engine first performs a search based on keywords. The results of this search are provided to the context search engine. The results of the two searches are merged and are provided or displayed to the user according to block 870.

Figure 9:
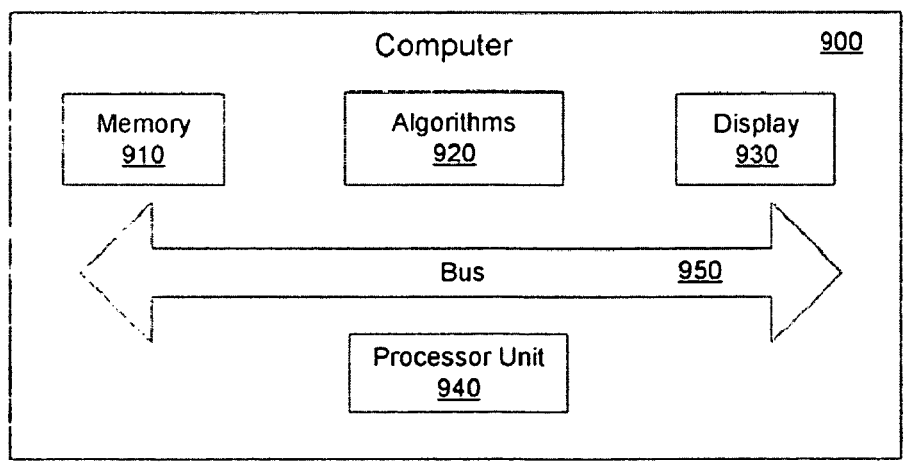
FIG. 9 illustrates a computer system for implementing methods according to an exemplary embodiment.

FIG. 9 is a block diagram of a server or computer 900 in accordance with an exemplary embodiment. In one embodiment, the computer includes memory 910, one or more algorithms 920 (example, algorithms for implementing one or more aspects of exemplary embodiments), display 930, processing unit 940 and one or more buses 950.

In one embodiment, the processor unit includes a processor (such as a central processing unit, CPU, microprocessor, etc.) for controlling the overall operation of memory 910 (such as random access memory (RAM) for temporary data storage, read only memory (ROM) for permanent data storage, and firmware). The memory 910, for example, stores applications, data, programs, algorithms (including software to implement or assist in implementing embodiments herein) and other data. The processing unit 940 communicates with memory 910 and display 930 via one or more buses 950.

As used herein and in the claims, the following words are defined as follows:

The word "content" means to have within, comprise, or include. For example, the contents of a document (spreadsheet, word processing document, email, web page, drawing, photo, etc.) are visible to a user as a text snippet and contained within the document.

The word "context" means tasks and data that surround the content.

The term "document" means a writing or image that conveys information, such as an electronic file or a physical material substance (example, paper) that includes writing using markings or symbols. Documents and articles can be based in any medium of expression and include, but are not limited to, magazines, newspapers, books, published and non-published writings, pictures, images, text, etc. Electronic documents can also include video and/or audio files or links.

The term "file" has broad application and includes electronic articles and documents (example, files produced or edited from a software application), collection of related data, and/or sequence of related information (such as a sequence of electronic bits) stored in a computer. In one exemplary embodiment, files are created with software applications and include a particular file format (i.e., way information is encoded for storage) and a file name. Embodiments in accordance with the present invention include numerous different types of files such as, but not limited to, image and text files (a file that holds text or graphics, such as ASCII files: American Standard Code for Information Interchanges HTML files: Hyper Text Markup Language; PDF files: Portable Document Format; and Postscript files; TIFF: Tagged Image File Format; JPEG/JPG: Joint Photographic Experts Group; GIF: Graphics Interchange Format; etc.), etc.

A "graph" is a set of objects, vertices, or nodes that are connected or linked with edges or arcs. A "vertex" (plural, "vertices") is an item, object, or node in a graph. An "edge" is a connection between two vertices of a graph. Further, as used herein, a graph can be decomposed wherein the vertex set is partitioned into paired disjoint independent subsets called "partite sets." For example, a graph can be decomposed into two partite sets but not fewer ("bipartite"), three partite sets but not fewer ("tripartite"), or k partite sets but not fewer (k-partite). Thus, a "multipartite" graph is decomposed into multiple numbers of partite sets.

The terms "similar" or "similarity" mean having characteristics in common and/or closely resembling each other. Thus, two documents are similar if they are identical or if they have characteristics or substance in common. Two different documents, for example, can be similar even though the two documents are not identical. In one embodiment, "similarity" refers to being derived from the same document. For example, seeing a document scrolled ½ through a page and seeing a document scrolled ¾ a page will have similar contents between them in the sense that they come from the same document.

The term "text snippet" or "snippet" means visible or focused text (including letters, numbers, symbols, data, etc.) and/or images being displayed on a screen or display. For example, if a document contains numerous pages (more pages that can be simultaneously displayed to a user on a computer screen), then a text snippet is that portion of the document currently in focus in a window or visible to the user.

Exemplary embodiments use text snippets to identify the context of user interface events and then tie that information to the file events in a way that can be later queried. In the case of visible text, exemplary embodiments capture these text snippets and tie them to the relevant file events. Exemplary embodiments, however, are not limited to text, images, or other information being displayed. For example in the case of audio cues, such as voice commands or playing a song, a filter is used on the audio to extract the text. This text is then used in a similar fashion to the text snippets as described herein. As another example, in the case of video, the audio track is extracted in a similar fashion, or if subtitles are available they are extracted through optical character recognition. Another approach to these alternate user interface events is to change the query interface. For example, if queries are executed through voice commands, the system has two options. One option is to convert the voice command to text and execute as normal. Another option is to store all interface events as audio snippets (instead of text), and then use signal processing to match the voice command to similar audio snippets.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments are provided as examples and should not be construed to limit other embodiments. For instance, blocks in diagrams or numbers (such as (1), (2), etc.) should not be construed as steps that must proceed in a particular order. Additional blocks/steps may be added, some blocks/steps removed, or the order of the blocks/steps altered and still be within exemplary embodiments. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the embodiments.

Various embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term tangible storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments. Numerous variations and modifications will become apparent to those skilled in the art once the above disclosure is fully appreciated. It is intended that the following claims be interpreted to embrace all such variations and modifications.

What is claimed is:

1. A method, comprising:
    collecting user interface events and file system events to capture text snippets in focus on an output device;
    pairing the text snippets with related files;
    using the text snippets and the related files to build a context graph; and
    using the context graph to locate a file.

2. The method of claim 1, wherein a text snippet seen within a context interval time of a file event is related to a file with a strength defined as D times P, where D is a duration of time the text snippet is focused on a display of the output device and P is a proximity of the text snippet to the file event.

3. The method of claim 1 further comprising, strengthening links between the text snippets and the related files in the context graph based on a length of time over which a text snippet is visible and a temporal distance between the text snippet and a file event.

4. The method of claim 3, wherein the length of time for the text snippet is defined as:

$$S=(S_{end}-S_{start})/\text{contextinterval},$$

where S is the length of time over which the text snippet is visible, $S_{start}$ is a point at which the text snippet is seen that is not similar to a previous text snippet, $S_{end}$ is a point at which a new text snippet that is not similar to S is seen, and contextinterval is a time period during which the text snippet is considered related to the file.

5. The method of claim 3, wherein the temporal distance between the text snippet and the file event is defined as:

$$\text{proximity }(S,F)=\min(|t_F-S_{start}|,|t_F-S_{end}|)/(\text{contextinterval}\times\tfrac{1}{2}),$$

where $t_F$ is a time at which the file event starts, $S_{start}$ is a point at which the text snippet is seen that is not similar to a previous text snippet, $S_{end}$ is a point at which a new text snippet that is not similar to S is seen, and contextinterval is a time period during which the text snippet is considered related to the file.

6. A tangible computer-readable storage medium having computer-readable program code embodied therein that causes a computer system to perform:
    building a context graph including text snippets and files with links between nodes indicating a strength of a contextual relationship;
    pairing the text snippets with the files where a link weight between a text snippet and a file is increased when the text snippet is in temporal proximity to an event on the file; and
    using the context graph to classify a file.

7. The tangible computer-readable storage medium of claim 6 that causes the computer system to further perform: merging similar text snippets together.

8. The tangible computer-readable storage medium of claim 6 that causes the computer system to further perform: capturing visible text displayed to a user as a text snippet.

9. The tangible computer-readable storage medium of claim 6 that causes the computer system to further perform:
    receiving a search request to locate a document; and
    using the context graph to locate the document, wherein the context graph is a bipartite graph.

10. The tangible computer-readable storage medium of claim 6 that causes the computer system to further perform:
    capturing the text snippets of what is displayed for a user to see;
    capturing times at which the text snippets become visible to the user;
    capturing a duration over which the text snippets are visible; and
    capturing times at which the files are accessed.

11. A computer system, comprising:
    a display;
    a memory that stores an algorithm; and
    a processor that executes the algorithm to:
        store user interface events and file system events to capture text snippets visible on the display;
        pair the text snippets with related files; and
        use a context graph that includes the text snippets and the related files to locate a document from a query.

12. The computer system of claim 11, wherein a link weight between a text snippet and a file in the context graph is increased when the text snippet is seen in close temporal proximity to an event on the file.

13. The computer system of claim 11, wherein a link weight between a text snippet and a file in the context graph is increased as a length of time during which the text snippet is visible increases.

14. The computer system of claim 11, wherein closer in time a text snippet appears to a file event more likely the text snippet is related to the file event.

15. The computer system of claim 11, wherein the processor further executes the algorithm to pass the query to a content index to identify relevant text snippets and then use the context graph to locate the document.

* * * * *

UNITED STATES PATENT AND TRADEMARK OFFICE
CERTIFICATE OF CORRECTION

| | |
|---|---|
| PATENT NO. | : 8,122,069 B2 |
| APPLICATION NO. | : 12/255619 |
| DATED | : February 21, 2012 |
| INVENTOR(S) | : Craig A. Soules et al. |

It is certified that error appears in the above-identified patent and that said Letters Patent is hereby corrected as shown below:

In the Claims:

In column 17, lines 43-44, in Claim 5, delete "(contextinteral)" and insert -- (contextinterval --, therefor.

Signed and Sealed this
Eighteenth Day of June, 2013

Teresa Stanek Rea
*Acting Director of the United States Patent and Trademark Office*